United States Patent
Letko et al.

(10) Patent No.: US 12,110,306 B2
(45) Date of Patent: Oct. 8, 2024

(54) BETA-HYDROXYPHOSPHONATE FUNCTIONALIZED POLYOLS

(71) Applicant: Dow Global Technologies LLC, Midland, MI (US)

(72) Inventors: Christopher S. Letko, Lake Jackson, TX (US); Ravi B. Shankar, Midland, MI (US); Harshad M. Shah, Lake Jackson, TX (US); Weijun Zhou, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 575 days.

(21) Appl. No.: 17/427,149

(22) PCT Filed: Jan. 29, 2020

(86) PCT No.: PCT/US2020/015590
§ 371 (c)(1),
(2) Date: Jul. 30, 2021

(87) PCT Pub. No.: WO2020/160094
PCT Pub. Date: Aug. 6, 2020

(65) Prior Publication Data
US 2022/0119427 A1  Apr. 21, 2022

Related U.S. Application Data

(60) Provisional application No. 62/799,411, filed on Jan. 31, 2019.

(51) Int. Cl.
*C07F 9/40* (2006.01)
*C08G 18/10* (2006.01)
*C08G 18/38* (2006.01)
*C08G 18/42* (2006.01)
*C08G 18/48* (2006.01)

(52) U.S. Cl.
CPC ............ *C07F 9/4006* (2013.01); *C08G 18/10* (2013.01); *C08G 18/388* (2013.01); *C08G 18/42* (2013.01); *C08G 18/4219* (2013.01); *C08G 18/48* (2013.01); *C08G 2110/0025* (2021.01)

(58) Field of Classification Search
CPC ......... C07F 9/40; C08G 18/388; C08G 18/10; C08G 18/48; C08G 18/42
See application file for complete search history.

(56) References Cited

U.S. PATENT DOCUMENTS

| 3,442,827 | A | 5/1969 | Friedman |
| 3,644,599 | A * | 2/1972 | Kuehn ............... C08G 18/6785 521/169 |
| 3,700,739 | A | 10/1972 | Kuehn |
| 3,945,967 | A | 3/1976 | Jaquiss |
| 4,316,006 | A | 2/1982 | Mcewen |
| 8,921,439 | B2 | 12/2014 | Piotrowski et al. |
| 11,046,807 | B2 | 6/2021 | Tomczak et al. |
| 2013/0184366 | A1 | 7/2013 | Jimenez et al. |
| 2014/0018471 | A1 | 1/2014 | Kagumba et al. |
| 2015/0329691 | A1 | 11/2015 | Skowronski et al. |
| 2018/0282468 | A1* | 10/2018 | Reisch ................. C08G 18/758 |

FOREIGN PATENT DOCUMENTS

| CN | 104370960 A * | 2/2015 | |
| WO | WO-2012088406 A2 * | 6/2012 | ............ C07F 9/4006 |
| WO | WO-2019204625 A1 * | 10/2019 | ............ C07F 9/4006 |

OTHER PUBLICATIONS

Xing, et al., Synthesis of reactive phosphonate flame retardants and their application in polyurethane flame retardancy; Polymer Materials Science and Engineering, vol. 33, No. 8 (Aug. 2017) (8 Pgs) (Original Document Available Only; Translation Not Available).
Serafin-Lewanczuk, M, et al., Fungal synthesis of chiral phosphonic synthetic platform—Scope and limitations of the method; Elsevier, Bioorganic Chemistry, vol. 77 Feb. 2, 2018) (9 Pgs).
Sobhani, et al., "Efficient one-pot synthesis of b-hydroxyphosphonates: regioselective nucleophilic ring opening reaction of epoxides with triethyl phosphite catalyzed by Al(OTf)3"; Elsevier, Tetrahedron, vol. 65 (Jul. 2, 2009) (5 pgs).
International Preliminary Report on Patentability for related PCT Application PCT/US2020/015590, mailed Aug. 12, 2021 (7 pgs).
Sardarian, et al., "Convenient and Regioselective One-Pot Solvent-Free Synthesis of B-Hydroxyphosphonates"; Synthetic Communications, vol. 37 (Received: Feb. 2, 2006, Published 2007) (7 pgs).
Velencoso, et al., "Fire Retardant Functionalized Polyol by Phosphonate Monomer Insertion"; Society of Chemical Industry, www.soci.org, vol. 64, ( Aug. 19, 2015) (9 pgs).
International Search Report & Written Opinion for related PCT Application PCT/US2020/015590, mailed Jul. 30, 2020 (13 pgs).
Sobhani, et al., Efficient one-pot synthesis of B-Hydroxyphosphonates: Regioselective Nucleophilic Ring Opening reaction of Epoxides with Triethyl Phosphite Catalyzed by Al(OTf)3; Tetrahedron, Elsevier Science Publishers, vol. 65, No. 36, Sep. 5, 2009 (6 pgs).

* cited by examiner

*Primary Examiner* — Michael L Leonard

(57) ABSTRACT

Embodiments of the present disclosure are directed towards β-hydroxyphosphonate functionalized polyols and isocyanate reactive compositions that include the β-hydroxyphosphonate functionalized polyol and a base polyol.

9 Claims, No Drawings

BETA-HYDROXYPHOSPHONATE FUNCTIONALIZED POLYOLS

This application is a National Stage Application under 35 U.S.C. § 371 of International Application Number PCT/US2020/015590, filed Jan. 29, 2020 and published as WO 2020/160094 on Aug. 6, 2020, which claims the benefit to U.S. Provisional Application 62/799,411, filed Jan. 31, 2019, the entire contents of which are incorporated herein by reference in its entirety

FIELD OF DISCLOSURE

Embodiments of the present disclosure are directed towards β-hydroxyphosphonate functionalized polyols and isocyanate reactive compositions including a base polyol and the β-hydroxyphosphonate functionalized polyol.

BACKGROUND

Cured materials may be utilized for a number of applications. For some applications, cured materials having one or more improved fire resistance properties are desired. There is continued focus in the industry on developing new and improved curable materials.

SUMMARY

The present disclosure provides β-hydroxyphosphonate functionalized polyols.

The present disclosure provides isocyanate reactive compositions including a base polyol and the β-hydroxyphosphonate functionalized polyol.

The present disclosure provides cured products formed from curing the isocyanate reactive compositions.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

β-hydroxyphosphonate functionalized polyols are disclosed herein. The β-hydroxyphosphonate functionalized polyols can advantageously be utilized in isocyanate reactive compositions that can be utilized to form cured products, where the cured products have one or more improved properties, such as fire resistance properties. For instance, a cured product formed from the isocyanate reactive compositions that are disclosed herein may have an improved, e.g., greater, char yield; an improved, e.g., greater, glass transition temperature as compared to cured products having plasticizing phosphorus additives; an improved, i.e. lower, peak heat release rate; an improved, i.e. lower, total heat release; and/or an improved, i.e. lower, mass loss.

The β-hydroxyphosphonate functionalized polyols may be represented by the following Formula I:

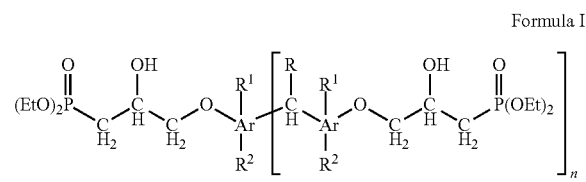

Formula I where

R is selected from: H or

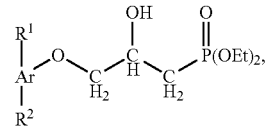

$R^1$ and $R^2$ are each independently selected from: H or $CH_3$,

Ar is: $C_6H_2$, n is: 1-5.

One or more embodiments of the present disclosure provide that the β-hydroxyphosphonate functionalized polyol is selected from tris(4-hydroxyphenyl)methane phosphonate, cresol phosphonate, and combinations thereof.

Tris(4-hydroxyphenyl)methane phosphonate may be represented by the following Formula II:

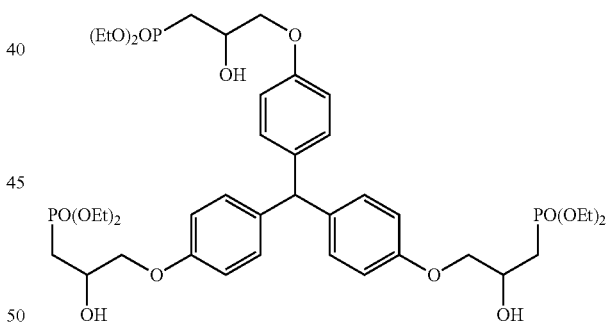

As an example, tris(4-hydroxyphenyl)methane phosphonate may be formed by the following synthesis:

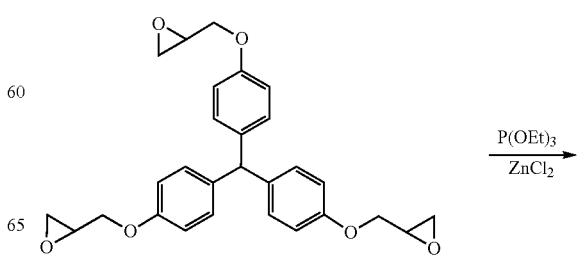

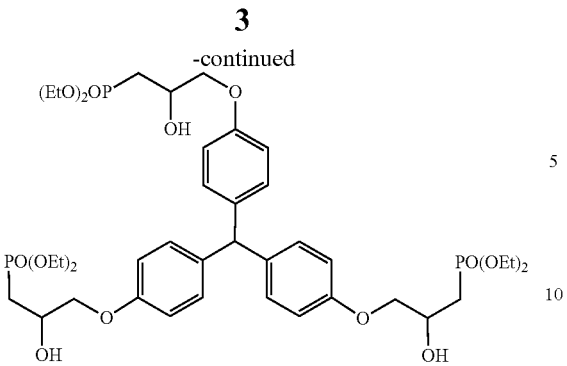

Cresol phosphonate may be represented by the following Formula III:

Formula III

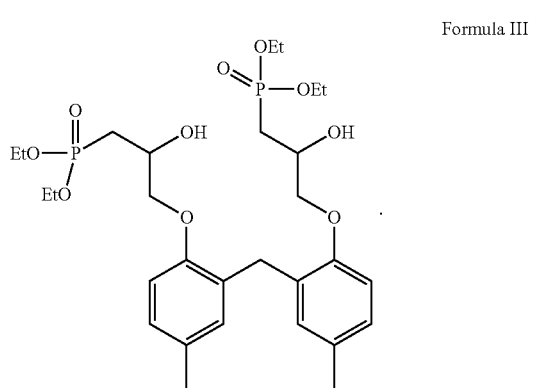 [SMILES: CCOP(=O)(CC(O)COc1ccc(C)cc1Cc1cc(C)ccc1OCC(O)CP(=O)(OCC)OCC)OCC]

As an example, cresol phosphonate may be formed by the following synthesis:

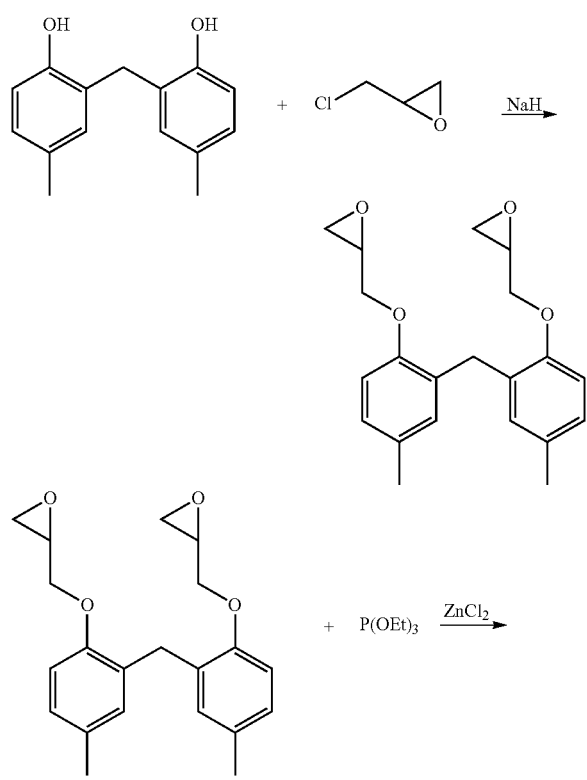

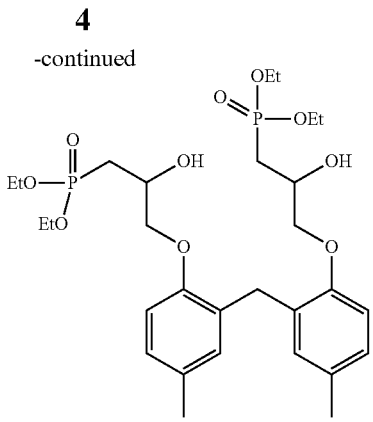

The β-hydroxyphosphonate functionalized polyol may be combined with a base polyol to form an isocyanate reactive composition.

Isocyanate reactive compositions including the β-hydroxyphosphonate functionalized polyol and a base polyol are disclosed herein. Advantageously, utilizing the β-hydroxyphosphonate functionalized polyol in the isocyanate reactive compositions can provide one or more improved fire resistance properties for cured products formed from the isocyanate reactive compositions are disclosed herein.

The β-hydroxyphosphonate functionalized polyol can be from 2 to 50 parts of the isocyanate reactive composition based upon 100 parts of the combination of the base polyol and the β-hydroxyphosphonate functionalized polyol. All individual values and subranges from 2 to 50 parts are included; for example, the β-hydroxyphosphonate functionalized polyol can be from a lower limit of 2, 4, or 6 parts of the isocyanate reactive composition based upon 100 parts of the combination of the base polyol and the β-hydroxyphosphonate functionalized polyol to an upper limit of 50, 35, 25, or 15 parts of the isocyanate reactive composition based upon 100 parts of the combination of the base polyol and the β-hydroxyphosphonate functionalized polyol.

Utilizing the β-hydroxyphosphonate functionalized polyol can help to provide that the isocyanate reactive compositions disclosed herein have a desirable aromatic group content, which may be desirable for a number of applications. Aromatic group content of a compound can be determined by dividing the total molecular weight of aromatic rings in a given compound by the compound's overall molecular weight; aromatic group content of a composition can be determined by dividing the weighted average of aromatic group contents for each compound in a given composition by the composition's overall weight. Embodiments of the present disclosure provide that the isocyanate reactive composition has an aromatic group content from 5 to 35 weight percent based upon a total weight of a combination of the β-hydroxyphosphonate functionalized polyol and the base polyol. All individual values and subranges from 5 to 35 weight percent are included; for example, the isocyanate reactive composition can have an aromatic group content from a lower limit of 5, 7, or 10 weight percent to an upper limit of 35, 30, or 25 weight percent based upon the total weight of the combination of the β-hydroxyphosphonate functionalized polyol and the base polyol.

Utilizing the β-hydroxyphosphonate functionalized polyol can help to provide that the isocyanate reactive compositions disclosed herein have a desirable phosphorous content, which may be desirable for a number of applications. Phosphorous content of a compound can be determined by dividing the total molecular weight of phosphorous in a given compound by the compound's overall molecular weight; phosphorous content of a composition can be determined by dividing the weighted average of phosphorous contents for each compound in a given composition by the composition's overall weight. Embodiments of the present disclosure provide that the isocyanate reactive composition has a phosphorous content from 0.1 to 5.0 weight percent based upon a total weight of the polyol composition. All individual values and subranges from 0.1 to 5.0 weight percent are included; for example, the isocyanate reactive composition can have a phosphorous content from a lower limit of 0.1, 0.2, or 0.3 weight percent to an upper limit of 5.0, 4.0, or 3.0 weight percent based upon a total weight of the isocyanate reactive composition.

As mentioned, the isocyanate reactive compositions disclosed herein include a base polyol. As used herein, "polyol" refers to a molecule having an average of greater than 1.0 hydroxyl groups per molecule. Various base polyols may be utilized for the isocyanate reactive composition. Examples of base polyols include, but are not limited to a polyester polyols, polyether polyols, polycarbonate polyols, and combinations thereof.

As used herein, "a," "an," "the," "at least one," and "one or more" may be used interchangeably unless indicated otherwise. The term "and/or" means one, one or more, or all of the listed items. The recitations of numerical ranges by endpoints include all numbers subsumed within that range, e.g., 1 to 5 includes 1, 1.5, 2, 2.75, 3, 3.80, 4, 5, etc.

Polyester polyols may be prepared from, for example, organic dicarboxylic acids having from 2 to 12 carbon atoms, including aromatic dicarboxylic acids having from 8 to 12 carbon atoms and polyhydric alcohols, including diols and triols having from 2 to 12 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomeric naphthalene-dicarboxylic acids. The dicarboxylic acids may be used either individually or mixed with one another. Free dicarboxylic acids may be replaced by a corresponding dicarboxylic acid derivative, for example, dicarboxylic esters of alcohols having 1 to 4 carbon atoms or dicarboxylic anhydrides. Some particular examples may utilize dicarboxylic acid mixtures including succinic acid, glutaric acid and adipic acid in ratios of, for instance, from 20 to 35:35 to 50:20 to 32 parts by weight, and adipic acid, and mixtures of phthalic acid and/or phthalic anhydride and adipic acid, mixtures of phthalic acid or phthalic anhydride, isophthalic acid and adipic acid or dicarboxylic acid mixtures of succinic acid, glutaric acid and adipic acid and mixtures of terephthalic acid and adipic acid or dicarboxylic acid mixtures of succinic acid, glutaric acid and adipic acid. Examples of dihydric and polyhydric alcohols are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane, among others. Some particular examples provide that ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, e.g., ε-caprolactone or hydroxycarboxylic acids, e.g., w-hydroxycaproic acid and hydrobenzoic acid, may also be employed.

Some embodiments of the present disclosure provide that polyester polyols may be prepared by polycondensing the organic, e.g., aliphatic and preferably aromatic polycarboxylic acids and mixtures of aromatic and aliphatic polycarboxylic acids, and/or derivatives thereof, and polyhydric alcohols without using a catalyst or in the presence of an esterification catalyst, in an inert gas atmosphere, e.g., nitrogen, carbon monoxide, helium, argon, inter alia, in the melt at from about 150 to about 250° C., at atmospheric pressure or under reduced pressure until a desired acid number, which can be less than 10, e.g., less than 2, is reached. Some embodiments of the present disclosure provide that the esterification mixture is polycondensed at the above mentioned temperatures under atmospheric pressure and subsequently under a pressure of less than 500 millibar, e.g., from 50 to 150 mbar, until an acid number of from 80 to 30, e.g., from 40 to 30, has been reached. Examples of suitable esterification catalysts include, but are not limited to, iron, cadmium, cobalt, lead, zinc, antimony, magnesium, titanium and tin catalysts in the form of metals, metal oxides or metal salts. Polycondensation may also be carried out in a liquid phase in the presence of diluents and/or entrainers, e.g., benzene, toluene, xylene or chlorobenzene, for removal of the water of condensation by azeotropic distillation, for instance.

Polyester polyols can be prepared by polycondensing organic polycarboxylic acids and/or derivatives thereof with polyhydric alcohols in a molar ratio of carboxylic acid group to hydroxyl group from 1:1.1 to 1:4, e.g., from 1:1.2 to 1:3, or from 1:1.5 to 1:2.5, for instance.

Anionic polymerization may be utilized, e.g., when preparing polyether polyols. For instance, alkali metal hydroxides such as sodium hydroxide or potassium hydroxide, or alkali metal alkoxides, such as sodium methoxide, sodium ethoxide, potassium ethoxide or potassium isopropoxide as catalyst and with addition of at least one initiator molecule containing from 2 to 8 reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety may be utilized.

Examples of suitable alkylene oxides include, but are not limited to, tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other, or as mixtures. Examples of suitable initiator molecules include, but are not limited to, water, organic dicarboxylic acids such as succinic acid, adipic acid, phthalic acid and terephthalic acid, and a variety of amines, including but not limited to aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylene-diamine, 1,3- and 1,4-butylene diamine, 1,2-, 1,3-, 1,4-, 1,5- and 1,6-hexamethylenediamine, aniline, cyclohexanediamine, phenylenediamines, 2,3-, 2,4-, 3,4- and 2,6-tolylenediamine and 4,4'-, 2,4'- and 2,2'-diaminodiphenylmethane. Other suitable initiator molecules include alkanolamines, e.g., ethanolamine, N-methyl- and N-ethylethanolamine, dialkanolamines, e.g., diethanolamine, N-methyl- and N-ethyldiethanolamine, and trialkanolamines, e.g., triethanolamine, and ammonia, and polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, polyhydric phenols, for example, 4,4'-dihydroxydiphenylmethane and 4,4'-dihydroxy-2,2-diphenylpropane, resols, for example, oligomeric products of the condensation of phenol and formaldehyde, and Mannich condensates of phenols, formaldehyde and dialkanolamines, and melamine.

One or more embodiments of the present disclosure provide that the base polyol can include polyether polyols prepared by anionic polyaddition of at least one alkylene oxide, e.g., ethylene oxide or 1,2-propylene oxide or 1,2-propylene oxide and ethylene oxide, onto, as initiator molecule, at least one aromatic compound containing at least two reactive hydrogen atoms and containing at least one hydroxyl, amino and/or carboxyl group. Examples of initiator molecules include aromatic polycarboxylic acids, for example, hemimellitic acid, trimellitic acid, trimesic acid and preferably phthalic acid, isophthalic acid and terephthalic acid, or mixtures of at least two polycarboxylic acids, hydroxycarboxylic acids, for example, salicylic acid, p- and m-hydroxybenzoic acid and gallic acid, aminocarboxylic acids, for example, anthranilic acid, m- and p-aminobenzoic acid, polyphenols, for example, resorcinol, and according to one or more embodiments of the present disclosure, dihydroxydiphenylmethanes and dihydroxy-2,2-diphenylpropanes, Mannich condensates of phenols, formaldehyde and dialkanolamines, preferably diethanolamine, and aromatic polyamines, for example, 1,2-, 1,3- and 1,4-phenylenediamine, e.g., 2,3-, 2,4-, 3,4- and 2,6-tolylenediamine, 4,4'-, 2,4'- and 2,2'-diamino-diphenylmethane, polyphenylpolymethylene-polyamines, mixtures of diamino-diphenylmethanes and polyphenyl-polymethylene-polyamines, as formed, for example, by condensation of aniline with formaldehyde, and mixtures of at least two polyamines.

Examples of hydroxyl-containing polyacetals include compounds which may be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Examples of hydroxyl-containing polycarbonates can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g., diphenyl carbonate, or phosgene.

Commercially available base polyols may be utilized. Examples of commercially available base polyols include, but are not limited to, polyols under the trade names VORANOL™, such as VORANOL 8000LM, VORANOL 230-238, VORANOL 4000LM, VORANOL 1010L, and VORANOL 230-660; TERCAROL™; and VORATEC™; as well as Polyglycol P2000 and Polyglycol P425, all available from the DOWDUPONT LLC, among other commercially available base polyols.

The base polyol can be from 50 to 98 parts of the isocyanate reactive composition based upon 100 parts of a combination of the base polyol and the β-hydroxyphosphonate functionalized polyol. All individual values and subranges from 50 to 98 parts are included; for example, the base polyol can be from a lower limit of 50, 65, 75, or 85 parts of the isocyanate reactive composition based upon 100 parts of a combination of the base polyol and the β-hydroxyphosphonate functionalized polyol to an upper limit of 98, 96, or 94 parts of the isocyanate reactive composition based upon 100 parts of a combination of the base polyol and the β-hydroxyphosphonate functionalized polyol.

The isocyanate reactive compositions disclosed herein can include an isocyanate. The isocyanate may react with one or more components of the polyol composition to form a cured product, e.g. a plaque, a foam, a sheet, a film, or a molded article. The isocyanate may be a polyisocyanate. As used herein, "polyisocyanate" refers to a molecule having an average of greater than 1.0 isocyanate groups/molecule, e.g. an average functionality of greater than 1.0.

The isocyanate may be an aliphatic polyisocyanate, a cycloaliphatic polyisocyanate, an araliphatic polyisocyanate, an aromatic polyisocyanate, or combinations thereof, for example. Examples of isocyanates include, but are not limited to, polymethylene polyphenylisocyanate, toluene 2,4-/2,6-diisocyanate (TDI), methylenediphenyl diisocyanate (MDI), polymeric MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and combinations thereof, among others. As well as the isocyanates mentioned above, partially modified polyisocyanates including uretdione, isocyanurate, carbodiimide, uretonimine, allophanate or biuret structure, and combinations thereof, among others, may be utilized.

The isocyanate may be polymeric. As used herein "polymeric", in describing the isocyanate, refers to higher molecular weight homologues and/or isomers. For instance, polymeric methylene diphenyl isocyanate refers to a higher molecular weight homologue and/or an isomer of methylene diphenyl isocyanate.

As mentioned, the isocyanate may have an average functionality of greater than 1.0 isocyanate groups/molecule. For instance, the isocyanate may have an average functionality from 1.75 to 3.50. All individual values and subranges from 1.75 to 3.50 are included; for example, the isocyanate may have an average functionality from a lower limit of 1.75, 1.85, or 1.95 to an upper limit of 3.50, 3.40 or 3.30.

The isocyanate may have an isocyanate equivalent weight 80 g/eq to 300 g/eq. All individual values and subranges from 80 to 300 g/eq are included; for example, the isocyanate may have an isocyanate equivalent weight from a lower limit of 80, 90, 100, 125, 135, or 145 to an upper limit of 300, 290, 285, or 280 g/eq.

The isocyanate may be prepared by a known process. For instance, the polyisocyanate may be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The isocyanate may be obtained commercially. Examples of commercial isocyanates include, but are not limited to, polyisocyanates under the trade names VORANATE™, PAPI™, VORATEC™, and ISONATE™, such as VORANATE M 220, PAPI 580N, and PAPI 27, available from DOWDUPONT LLC, among other commercial isocyanates.

The isocyanate may be from 50 to 500 parts of the isocyanate reactive composition based upon 100 parts of a combination of the base polyol and the β-hydroxyphosphonate functionalized polyol. All individual values and subranges from 50 to 500 parts are included; for example, the isocyanate or may be from a lower limit of 50, 60, 70, 80, 100, 110, 125, or 140 parts to an upper limit of 500, 450, 400, 350, 300, 275, 250, 225, 215, 200, or 180 parts based upon 100 parts of a combination of the base polyol and the β-hydroxyphosphonate functionalized polyol.

The isocyanate may be utilized such that isocyanate-reactive components of the isocyanate reactive composition may be reacted with isocyanate components at an isocyanate index from 80 to 600. For instance, isocyanate-reactive components of the polyol composition may be reacted with the isocyanate at an isocyanate index from 80 to 600, 85 to 500, 85 to 450, 90 to 400, or 95 to 350, among others. The isocyanate index may be determined as equivalents of isocyanate divided by the total equivalents of isocyanate-reactive components of the isocyanate reactive composition, e.g., isocyanate-reactive hydrogen, multiplied by 100. In other words, the isocyanate index can be determined as a ratio of isocyanate-groups to isocyanate-reactive hydrogen, given as a percentage.

One or more embodiments of the present disclosure provide that the isocyanate index may be from 100 to 150, e.g., for rigid foam applications. All individual values and subranges from 100 to 150 are included; for example, the hybrid foam formulations may have an isocyanate index from a lower limit of 100, 103, 105, or 110 to an upper limit of 150, 140, 130, or 125.

The isocyanate reactive compositions disclosed herein can include a catalyst. Different catalysts may be utilized for various applications. The catalyst may be a blowing catalyst, a gelling catalyst, a trimerization catalyst, or a combination thereof. As used herein, blowing catalysts and gelling catalysts may be differentiated by a tendency to favor either the urea (blow) reaction, in the case of the blowing catalyst, or the urethane (gel) reaction, in the case of the gelling catalyst. A trimerization catalyst may be utilized to promote the isocyanurate reaction in the compositions.

Examples of blowing catalysts, e.g., catalysts that may tend to favor the blowing reaction include, but are not limited to, short chain tertiary amines or tertiary amines containing an oxygen. The amine based catalyst may not be sterically hindered. For instance, blowing catalysts include bis-(2-dimethylaminoethyl)ether; pentamethyldiethylene-triamine, triethylamine, tributyl amine, N,N-dimethylaminopropylamine, dimethylethanolamine, N,N,N',N'-tetramethylethylenediamine, and combinations thereof, among others. An example of a commercial blowing catalyst is POLYCAT 5, from Evonik, among other commercially available blowing catalysts.

Examples of gelling catalysts, e.g., catalyst that may tend to favor the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gelling catalyst, such as, for example, bismuth octanoate. Cyclic tertiary amines and/or long chain amines include dimethylbenzylamine, triethylenediamine, and combinations thereof., and combinations thereof. Examples of a commercially available gelling catalysts are POLYCAT 8, DABCO EG, and DABCO T-12 from Evonik, among other commercially available gelling catalysts.

Examples of trimerization catalysts include PMDETA-N, N,N',N'',N''-pentamethyldiethylenetriamine; N,N',N''-Tris (3-dimethylaminopropyl)hexahydro-S-triazine; N,N-dimethylcyclo-hexylamine; 1,3,5-tris(N,N-dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof, among others. Some commercially available trimerization catalysts include DABCO TMR-2, TMR-7, DABCO K 2097; DABCO K15, POLYCAT 41, and POLYCAT 46, each from Evonik, among other commercially available trimerization catalysts.

The catalyst may be from 0.05 to 10.0 parts of the isocyanate reactive composition based upon 100 parts of a combination of the base polyol and the β-hydroxyphosphonate functionalized polyol. All individual values and subranges from 0.05 to 10.0 parts are included; for example, the catalyst may be from a lower limit of 0.05, 0.07, 0.1, 0.2, or 0.3 parts to an upper limit of 10.0, 9.0, 8.0, 7.0, 6.0, 5.0, 4.5, 4.0, 3.5, 3.4, or 3.3 parts of the isocyanate reactive composition based upon 100 parts of a combination of the base polyol and the β-hydroxyphosphonate functionalized polyol.

Embodiments of the present disclosure provide that the isocyanate reactive composition may include a blowing agent. The blowing agent may be a physical blowing agent, a chemical blowing agent, or combinations thereof.

Examples of physical blowing agents include liquid carbon dioxide; ketones, such as acetone; esters; aldehydes; alkanes; cycloalkanes, such as, cyclopentane, cyclohexane, cyclobutane and mixtures thereof; other cycloalkanes having up to 7 carbon atoms; ethers, such as dialkyl ethers, cycloalkylene ethers, fluoroalkanes, hydrofluoroolefins, hydrochlorofluoroolefins, and mixtures thereof. Examples of alkanes include, but are not limited to, propane, butane, n-butane, isobutane, n-pentane, isopentane and combinations thereof. Examples of dialkyl ethers include dimethyl ether, methyl ethyl ether, methyl butyl ether, diethyl ether, and combinations thereof. An example of a cycloalkylene ether is furan. Examples of fluoroalkanes include, but are not limited to, pentafluoropropane, trifluoromethane, difluoromethane, difluoroethane, tetrafluoroethane, hepta-fluoropropane, pentafluorobutane, heptafluorobutane, and combinations thereof, among others. Examples of hydrofluoroolefins and/or hydrochlorofluoroolefins include, but are not limited to 1,1,1,4,4,5,5,5-octafluoro-2-pentene (HFC-1438mzz), Z-1,1,1,4,4,4-hexafluoro-2-butene (HFC-1336mzz, Z-isomer), trans-1,3,3,3-tetrafluoropropene, 1-chloro-3,3,3-trifluoropropene (HFO-1233zd). One or more embodiments provide that trans-1-chloro-3,3,3-trifluoropropene is utilized. An example of a commercially available physical blowing agents is Solstice 1233zd Liquid Blowing Agent from Honeywell, among other commercially available physical blowing agents.

Examples of chemical blowing agents include, but are not limited to, water, formic acid, methyl formate, $CO_2$ generating materials, and combinations thereof.

The blowing agent may be from 1.0 to 50.0 parts of the isocyanate reactive composition based upon 100 parts of a combination of the base polyol and the β-hydroxyphosphonate functionalized polyol. All individual values and subranges from 1.0 to 50.0 parts are included; for example, the blowing agent may be from a lower limit of 1.0, 1.5, or 2.0 parts to an upper limit of 50.0, 45.0, 43.0, 40.0, or 38.0 parts of the isocyanate reactive composition based upon 100 parts of a combination of the base polyol and the β-hydroxyphosphonate functionalized polyol.

The isocyanate reactive composition may include a surfactant. The surfactant may be a cell-stabilizing surfactant, for instance. Examples of surfactants include silicon-based compounds such as organosilicone-polyether copolymers, such as polydimethylsiloxane-polyoxyalkylene block copolymers, e.g., polyether modified polydimethyl siloxane, and combinations thereof. Examples of surfactants include non-silicone based organic surfactants such as VORASURF™ 504, available from The Dow Chemical Company. Surfactants are available commercially and include those available under trade names such as NIAX, such as NIAX L 6988; DABCO; and TEGOSTAB, such as TEGOSTAB B 8462; among others.

The surfactant may be from 0.1 to 10.0 parts of the isocyanate reactive composition based upon 100 parts of a combination of the base polyol and the β-hydroxyphosphonate functionalized polyol. All individual values and subranges from 0.1 to 10.0 parts are included; for example, the surfactant may be from a lower limit of 0.1, 0.2, or 0.3 parts to an upper limit of 10.0, 9.0, 8.0, 7.0, 6.0, 5.0, 4.0, or 3.0 parts of the isocyanate reactive composition based upon 100 parts of the combination of the base polyol and the β-hydroxyphosphonate functionalized polyol.

One or more embodiments of the present disclosure provide that the isocyanate reactive composition may include one or more additional components e.g., additional components known in the art. Examples of additional components include cell compatibilizing agents, additional crosslinkers, toughening agents, flow modifiers, viscosity modifiers, reactivity modifiers, solvents, carriers, adhesion promoters, diluents, stabilizers, plasticizers, catalyst de-activators, flame retardants, inorganic fillers, smoke suppression agents, liquid nucleating agents, solid nucleating agents, Ostwald ripening retardation additives, pigments, colorants, chain extenders, antioxidants, biocide agents, and combinations thereof, among others known in the art. Different additional components and/or different amounts of the additional components may be utilized for various applications.

The isocyanate reactive compositions disclosed herein may be cured, e.g., the isocyanate may be reacted with one or more components of the isocyanate reactive composition, to form a cured product. The cured product may be a plaque or a foam. The cured product may be prepared using known methods, equipment, and conditions, which may vary for different applications.

One or more embodiments of the present disclosure provide that the cured product is a plaque. The plaques disclosed herein may a number of properties that are desirable for a number of applications. For instance, the plaques disclosed herein may provide an improved, e.g., greater, TGA char yield at 700° C.

The plaques disclosed herein may have a TGA char yield at 700° C. from 30% to 50%. All individual values and subranges from 30% to 50% are included; for example, the plaque may have a TGA char yield at 700° C. from a lower limit of 30, 31, or 33% to an upper limit of 50, 45, or 40%. TGA char yield at 700° C. may be determined as the residual weight present at 700° C. Plaques samples can be subjected to a temperature profile of 25° C. to 700° C. at a ramp rate 50° C./min under an atmosphere of nitrogen to generate data for TGA char yield measurement.

The plaques disclosed herein may have a limiting oxygen index from 20% to 35%. All individual values and subranges from 20% to 35% are included; for example, the plaque may have a limiting oxygen index from a lower limit of 20, 22, or 24% to an upper limit of 35, 33, or 30%. Limiting oxygen index may be determined according to ASTM D2863.

The plaques disclosed herein may have a glass transition temperature of at least 45° C. For example, the plaque may have a glass transition temperature from 45° C. to 150° C. All individual values and subranges from 45° C. to 150° C. are included; for example, the plaque may have a glass transition temperature from a lower limit of 45, 50, or 52° C. to an upper limit of 150, 135, 120, 100, 90, 85, or 80° C. Glass transition temperature may be determined by dynamic mechanical analysis at a temperature ramp rate of 3° C./min and the oscillatory frequency of 6.28 rad/sec according to ASTM E1640. Advantageously, the plaques disclosed herein may have an improved, e.g., greater, glass transition temperature as compared to cured products that have similar levels of plasticizing phosphorus additive, but were not formed utilizing the β-hydroxyphosphonate functionalized polyol.

One or more embodiments of the present disclosure provide that the cured product is a foam. The foams disclosed herein may have one or more properties that are desirable for a number of applications.

The foams disclosed herein may have an improved, i.e. lower, peak heat release rate as compared to cured products that were formed while not utilizing the β-hydroxyphosphonate functionalized polyol. For example, the foam may have a peak heat release rate from 50 to 125 kW/m$^2$. All individual values and subranges from 50 to 125 kW/m$^2$ are included; for example, the foam may have a peak heat release rate from a lower limit of 50, 60, 75, 85, 95, or 110 kW/m$^2$ to an upper limit of 125, 123, or 120 kW/m$^2$. Peak heat release rate may be determined according to ASTM E1354.

The foams disclosed herein may have an improved, i.e. lower, total heat release as compared to cured products that were formed while not utilizing the β-hydroxyphosphonate functionalized polyol. For example, the foam may have a total heat release from 5 to 12.5 MJ/m$^2$. All individual values and subranges from 5 to 12.5 MJ/m$^2$ are included; the foam may have a total heat release from a lower limit of 5, 6, 7, 8, 9, or 10 MJ/m$^2$ to an upper limit of 12.5, 12.3, or 12.0 MJ/m$^2$. Total heat release rate may be determined according to ASTM E1354.

The foams disclosed herein may have an improved, i.e. lower mass loss as compared to cured products that were formed while not utilizing the β-hydroxyphosphonate functionalized polyol. For instance, the foam may have a mass loss from 15 to 48.5%. All individual values and subranges from 15 to 48.5 are included; for example, the foam may have a total mass loss from a lower limit of 15, 20, 25, 30, 35, or 40% to an upper limit of 48.5, 48.0, or 47.5%. Total mass loss may be determined according to ASTM E1354.

The foams disclosed herein may have a molded foam density from 20.0 to 45.0 kilograms per cubic meter (kg/m$^3$). All individual values and subranges from 20.0 to 45.0 kg/m$^3$ are included; for example, the foam may have a molded foam density from a lower limit of 20.0, 20.5, 21.0, 22.0, 23.0, 24.0 or 25.0 kg/m$^3$ to an upper limit of 45.0, 43.0, 42.0, 40.0 kg/m$^3$. Foams having such molded foam densities are highly desirable for a number of applications, e.g., insulated metal panels, board stock foam, and spray foam, among others.

The foams disclosed herein may have a compressive strength from 100 to 300 kPa. All individual values and subranges from 100 to 300 kPa are included; for example, the foam may have a compressive strength from a lower limit of 100, 110, 120, or 150 kPa to an upper limit of 300, 290, or 280 kPa. Compressive strength may be determined according to ASTM D1621.

The foams disclosed herein may have a K factor at 24° C. from 18 to 25 mW/m²*K. All individual values and subranges from 18 to 25 mW/m²*K are included; for example, the foam may have a K factor at 24° C. from a lower limit of 18, 18.5, or 19 mW/m²*K to an upper limit of 25, 24, or 23 mW/m²*K. K factor at 24° C. may be determined according to ASTM C518.

EXAMPLES

In the Examples, various terms and designations for materials are used including, for instance, the following:

Polyester polyol A (base polyol; aromatic polyester polyol; prepared from polyethylene glycol, diethylene glycol, glycerin, and terephthalic acid; average hydroxyl number 230 mg KOH/g and OH functionality of 2.1, aromatic content of 15 wt %);

IP 585 Polyol (polyether polyol; Novolac initiated; average hydroxyl number 196 mg KOH/g; obtained from DOWDUPONT LLC);

DABCO K 2097 (trimerization catalyst; obtained from Evonik);

DABCO EG (gelling catalyst; obtained from Evonik);

POLYCAT 5 (blowing catalyst; obtained from Evonik);

Triethyl phosphate (flame retardant; obtained from Sigma-Aldrich);

tris(4-hydroxyphenyl)methane triglycidyl ether (obtained from Sigma-Aldrich);

2,2'-Methylenebis(4-methylphenol) (obtained from Tokyo Chemical Industry);

PAPI 580N (isocyanate; polymethylene polyphenylisocyanate that contains MDI and has a NCO content of approximately 30.8 wt % and isocyanate equivalent molecular weight of 136.5; obtained from DOWDUPONT LLC);

Silicone Polyether Surfactant (surfactant; obtained from Evonik);

Cyclopentane (physical blowing agent; obtained from Sigma-Aldrich).

Commercial polyols were dried under a nitrogen stream to provide water levels were less than 500 ppm as determined with a Karl-Fischer titrator. Other materials were utilized as received.

Example 1 (β-hydroxyphosphonate functionalized polyol; tris(4-hydroxyphenyl)methane phosphonate (TPM phosphonate)) was prepared as follows. A solution of purified tris(4-hydroxyphenyl)methane triglycidyl ether (8.20 g, 17.8 mmol) in 20 mL of acetonitrile and triethyl phosphite (40 mL) was added to a container including dry zinc chloride (8.0 g, 58.7 mmol); the contents of the container were stirred for approximately 12 hours. Then saturated ammonium chloride (100 mL) and ethyl acetate (100 mL) was added to the container. Then the organic layer was separated and the aqueous layer was extracted with additional ethyl acetate (100 ml). The combined ethyl acetate fractions were dried over anhydrous MgSO$_4$ and concentrated under reduced pressure to provide a syrupy material. The material was purified by chromatography on silica gel using an ISCO flash chromatography unit with ethyl acetate: methanol (0 to 25%) as eluent to provide the TPM phosphonate (10.4 g; yield 68%). A 31P NMR signal showed the peak at 30 ppm in the desired range.

Example 2 (β-hydroxyphosphonate functionalized polyol; cresol phosphonate) was prepared as follows. Sodium hydride (1.42 g, 59.1 mmol) was added to a stirred, cold container including 2,2'-methylenebis(4-methylphenol) (5.0 g, >90%, 19.7 mmol) in 15 mL of DMF (anhydrous); the sodium hydroxide was added in portions and allowed to stir for 30 min in a glove box. Epichlorohydrin (5.47 g, 59.1 mmol) was added to the container via a syringe and the contents of the container were stirred at ambient temperature for approximately 24 hours. Then the reaction was quenched with water (2 mL) and the contents of the container were extracted with ethyl acetate (2×25 mL). The organic layer was washed with water (25 mL), dried over anhydrous magnesium sulfate, filtered, and the filtrate was concentrated under reduced pressure. The residual orange oil was subjected to chromatography on silica gel with hexane: ethyl acetate (20% to 50%) as eluent using an ISCO flash chromatography unit. The product, bis(5-methyl-2-(oxirane-2-ylmethoxy)phenyl)methane (2.0 g, yield 30%), was isolated as white solid and characterized by 1H and 13C NMR spectra.

The bis(5-methyl-2-(oxiran-2-ylmethoxy)phenyl)methane (1.80 g, 5.29 mmol, in 20 mL of triethylphosphite and 8 mL of acetonitrile) and zinc chloride (1.59 g, 11.63 mmol) were added to a container and the contents were stirred at ambient temperature. Saturated ammonium chloride (50 mL) and ethyl acetate (50 mL) were added to the container. Then the organic layer was separated and the water layer was extracted with additional ethyl acetate (50 mL). The combined ethyl acetate layer was dried over anhydrous MgSO$_4$ and concentrated under reduced pressure. The residue was chromatographed over silica gel using an ISCO flash chromatography unit with ethyl acetate: methanol (0 to 20%) as eluent to yield cresol phosphonate (2.5 g, yield, 77%). The cresol phosphonate was characterized by 1H, 13C and 31P NMR spectra.

Example 3, an isocyanate reactive composition, was prepared as follows. TPM phosphonate and polyol were added to a container; then DABCO EG was added to the container and the contents of the container were mixed with a Flactek speedmixer at 3500 for approximately 1 minute. Thereafter, PAPI 580N was added to the container and the contents were mixed with the Flactek speedmixer at 3500 for approximately 1 minute. The respective amounts that were utilized are reported in Table 1; the amounts are based upon 100 parts of a combination of the base polyol and the β-hydroxyphosphonate functionalized additive.

Example 4, an isocyanate reactive composition, was prepared as Example 3 with the change that cresol phosphonate was utilized rather than TPM phosphonate. The reported aromatic group content for Examples 3-4 was based upon a total weight of a combination of the β-hydroxyphosphonate functionalized polyol and the base polyol.

After mixing, each the containers including Examples 3-4 was transferred to a respective standing vertical mold to form Examples 5-6, cured products, i.e. plaques. The standing vertical mold had been preheated to 60° C. The contents of the standing vertical mold cured in an oven that was maintained at 60° C. for 60 minutes. Then the products were demolded and post-cured in an oven that was maintained at 100° C. for 60 minutes and thereafter cooled to room temperature.

The standing vertical mold comprised a steel panel (20 cm×20 cm×2.5 cm) that was fitted with a sheet of PTFE-coated aluminum (20 cm×20 cm×0.06 cm). A steel U-shaped spacer (18.5 cm×16.5 cm×0.4 cm) was placed on top of the PTFE-coated aluminum sheet. A piece of silicon tubing (diameter of approximately 1 cm) was then set to cover the inner perimeter of the U-shaped spacer. An additional PTFE-coated aluminum sheet and steel panel were subsequently placed on top of the apparatus to complete the mold's layered structure. The mold was held together using four metal C-clamps.

Comparative Examples (CE) A-C were prepared as Examples 3-4, with the change that the items and/or amounts listed in Table 1 were utilized; the amounts are based upon 100 parts of the polyol. Comparative Examples D-F were prepared as Examples 5-6, with the change that Comparative Examples A-C were utilized rather than Example 3-4. The reported aromatic group content for Comparative Examples A-C was based upon a total weight of the polyol.

A number of properties were determined for Examples 5-6 and Comparative Examples D-F. Limiting oxygen index (LOI) was determined according to ASTM D2863. A bundle of 10 samples (each sample was 100 mm×10 mm×40 mm) was prepared with a water jet cutter for each of the cured products. Glass transition temperature (Tg) was determined by dynamic mechanical analysis at a temperature ramp rate of 3° C./min and an oscillatory frequency of 6.28 rad/sec according to ASTM E1640. Thermogravimetric analysis (TGA) data was collected under a nitrogen atmosphere over a temperature range of 25° C. to 700° C. utilizing a ramp rate of 50° C./minute. The results are reported in Table 1.

approximately 2500 rpm for 5 seconds. The mixture was then poured into a preheated (54° C.) mold to form Example 8, a cured product, i.e. a foam. The size of the mold was 5 cm×20 cm×30 cm. The lid to the mold was closed and the mold was maintained at 54° C. for 15 minutes. Thereafter, Example 8 was removed from the mold.

Comparative Example G was prepared as Example 7, with the change that the items and/or amounts listed in Table 2 were utilized. For Comparative Example G, the amounts shown in Table 2 are based upon 100 parts of the polyol (the combination of Polyester polyol A and IP 585 Polyol). The reported aromatic group content for Comparative Example G was based upon a total weight of the polyol. Comparative Example H was prepared as Example 8, with the change that Comparative Example G was utilized rather than Example 7.

A number of properties were determined for Example 8 and Comparative Example H. Molded foam density was determined according to ASTM D1622. Compressive strength was determined according to ASTM D1621. K factor at 24° C. was determined according to ASTM C518. Peak heat release rate was determined according to ASTM E1354. Total heat release was determined according to ASTM E1354. Mass loss was determined according to

TABLE 1

|  | Example 3 | Example 4 | CE A | CE B | CE C |
| --- | --- | --- | --- | --- | --- |
| TPM phosphonate | 9 parts | — | — | — | — |
| Cresol phosphonate | — | 9.5 parts | — | — | — |
| Polyester polyol A | 91 parts | 90.5 parts | 70 parts | 70 parts | 91 parts |
| IP 585 Polyol | — | — | 30 parts | 30 parts | 9 parts |
| Triethyl phosphate | — | — | 6.13 parts | — | — |
| DABCO EG | 0.1 parts | 0.1 parts | 0.1 parts | 0.1 parts | 0.1 parts |
| PAPI 580N | 59 parts | 58 parts | 56 parts | 56 parts | 59 parts |
| Isocyanate index | 100 | 100 | 100 | 100 | 100 |
| Aromatic group content (wt %) | 16 | 16 | 18 | 18 | 16 |

| Cured Products | | | | | |
| --- | --- | --- | --- | --- | --- |
|  | Example 5 | Example 6 | CE D | CE E | CE F |
| LOI (%) | 27.0 | 27.5 | 27.2 | 24.4 | 24.9 |
| Tg ° C. | 58 | 55 | 50 | 62 | 60 |
| TGA Char yield at 700° C. (%) | 37 | 34 | 28 | 25 | 29 |

The data of Table 1 show that each of Examples 5-6 advantageously had an improved, e.g., greater, TGA char yield at 700° C. as compared to each of Comparative Examples D-F.

Additionally, the data of Table 1 show that when similar moles of phosphorus atoms were utilized, each of Examples 5-6 advantageously had an improved, e.g., greater, glass transition temperature as compared to Comparative Example D.

Example 7, an isocyanate reactive composition, was prepared as follows. TPM phosphonate and polyol were added to a container; then the components indicated in Table 2, except for PAPI 580N, were added to the container and the contents of the container were mixed to homogenize. For Example 7, the amounts shown in Table 2 are based upon 100 parts of the combination of the base polyol and the β-hydroxyphosphonate functionalized polyol. The reported aromatic group content for Example 7 was based upon a total weight of a combination of the β-hydroxyphosphonate functionalized polyol and the base polyol. Thereafter, the PAPI 580N was added to the container and the contents of the container were mixed with an overhead mixer at ASTM E1354. Total smoke release was determined according to ASTM E1354. Total smoke production was determined according to ASTM E1354.

TABLE 2

|  | Example 7 | CE G |
| --- | --- | --- |
| TPM phosphonate | 9 parts | — |
| Polyester polyol A | 91 parts | 91 parts |
| IP 585 Polyol | — | 9 parts |
| Water | 0.8 parts | 0.8 parts |
| Silicone Polyether Surfactant | 3 parts | 3 parts |
| DABCO K 2097 | 2.1 parts | 2.1 parts |
| POLYCAT 5 | 1.2 parts | 1.2 parts |
| Triethyl phosphate | 13.64 parts | 13.64 parts |
| Cyclopentane | 17.97 parts | 17.98 parts |
| PAPI 580N | 248 parts | 248 parts |
| Isocyanate index | 350 | 350 |
| Aromatic group content (wt %) | 16 | 16 |

TABLE 2-continued

| Cured Products | Example 8 | CE H |
|---|---|---|
| Density (kg/m$^3$) | 41.7 | 40.9 |
| Compressive strength (kPa) | 223 | 212 |
| K factor at 24° C. (mW/m$^2$*K) | 20.49 | 20.17 |
| Peak heat release rate (kW/m$^2$) | 114 | 128 |
| Total heat release (MJ/m$^2$) | 10.9 | 12.7 |
| Mass loss (%) | 46 | 49 |

The data of Table 2 show that Example 8 advantageously has an improved, i.e. lower, peak heat release rate as compared to Comparative Example H. Further, the data of Table 2 show that Example 8 has an improved, i.e. lower, total heat release as compared to Comparative Example H. Additionally, the data of Table 2 show that Example 8 has an improved, i.e. lower, mass loss as compared to Comparative Example H.

What is claimed is:

1. A β-hydroxyphosphonate functionalized polyol represented by the following Formula:

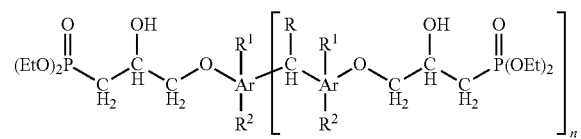

where

R is selected from: H or

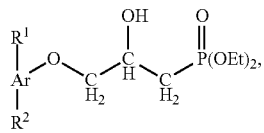

$R^1$ and $R^2$ are each independently selected from: H or CH$_3$,

Ar is: C$_6$H$_2$, n is: 1-5.

2. The β-hydroxyphosphonate functionalized polyol of claim 1, wherein the β-hydroxyphosphonate functionalized polyol is selected from tris(4-hydroxyphenyl)methane phosphonate, cresol phosphonate, and combinations thereof.

3. An isocyanate reactive composition comprising:
a base polyol; and
the β-hydroxyphosphonate functionalized polyol of claim 1, wherein the base polyol comprises from 50 to 98 parts of the isocyanate reactive composition based upon 100 parts of a combination of the base polyol and the β-hydroxyphosphonate functionalized polyol, and the β-hydroxyphosphonate functionalized polyol comprises from 2 to 50 parts of the isocyanate reactive composition based upon 100 parts of the combination of the base polyol and the β-hydroxyphosphonate functionalized polyol.

4. The isocyanate reactive composition of claim 3, wherein the base polyol is a polyester polyol, a polyether polyol, a polycarbonate polyol, or a combination thereof.

5. The isocyanate reactive composition of claim 3, including an isocyanate, wherein the isocyanate is from 50 to 500 parts of the isocyanate reactive composition based upon 100 parts of the combination of the base polyol and the β-hydroxyphosphonate functionalized polyol.

6. The isocyanate reactive composition of claim 3, wherein the isocyanate reactive composition has an aromatic group content from 5 to 35 weight percent based upon a total weight of a combination of the β-hydroxyphosphonate functionalized polyol and the base polyol.

7. The isocyanate reactive composition of claim 3, wherein the isocyanate reactive composition has an phosphorous content from 0.1 to 5.0 weight percent based upon a total weight of the isocyanate reactive composition.

8. A cured product formed from curing the isocyanate reactive composition of claim 3.

9. The cured product of claim 8, wherein the cured product is a plaque, a foam, or a film.

* * * * *